April 1, 1958 G. EISENMAN ET AL 2,829,090
GLASS ELECTRODE FOR MEASURING SODIUM ION
Filed Feb. 20, 1957 2 Sheets-Sheet 1

INVENTORS.
GEORGE EISENMAN
DONALD O. RUDIN
BY JAMES U. CASBY

Caesar and Rivise
ATTORNEYS.

United States Patent Office 2,829,090
Patented Apr. 1, 1958

2,829,090

GLASS ELECTRODE FOR MEASURING SODIUM ION

George Eisenman, Philadelphia, Donald O. Rudin, Narberth, and James U. Casby, Philadelphia, Pa., assignors to Commonwealth Mental Health Research Foundation, a body corporate and politic of Pennsylvania Application February 20, 1957, Serial No. 641,405

6 Claims. (Cl. 204—1)

This invention relates to a glass electrode for measuring sodium ion activity as a continuous function of time in ionic mixtures and in biological fluids.

This invention also relates to glass electrodes for use in measuring both sodium and potassium ions in mixtures of said ions.

In Trans. Faraday Soc. 30, 461 (1934), B. von Lengyel and E. Blum observed that the addition of $Al_2O_3$ or $B_2O_3$ to sodium silicate glasses caused the glass electrode potential to become dependent on the concentration of several cations other than $H^+$.

We have discovered that alkali oxide-silica glass electrodes containing more than a fraction of a mole percent $Al_2O_3$ are markedly cation sensitive, and that the sensitivity for different cations relative to each other is a systematic and reproducible function of glass composition.

We have also discovered that in cation mixtures of $H^+$, $K^+$ and $Na^+$, sensitivity of the glass electrode to $Na^+$ relative to $K^+$ over a wide range of pH is dependent upon the relative mole percentages of $Al_2O_3$ to the alkali oxide, such as $Na_2O$. This observation has enabled us to prepare a glass electrode which has practical utility for accurate determinations of $Na^+$ in the presence of $K^+$ and which is minimally sensitive to $H^+$.

The invention will best be understood with reference to the accompanying drawings, wherein.

Figure 1:
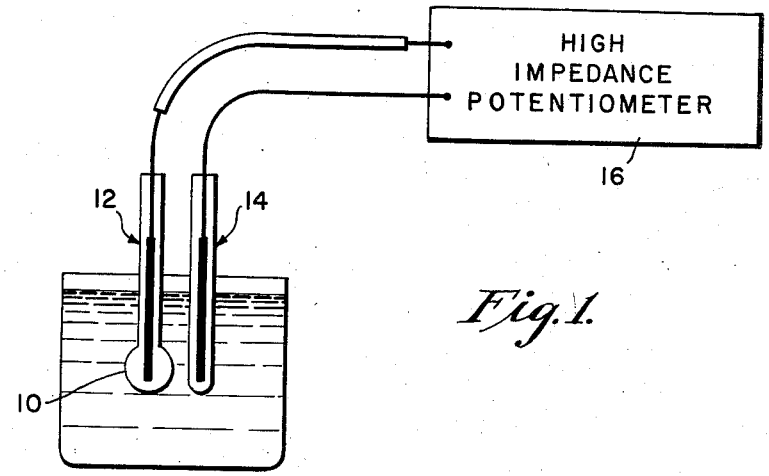
Figure 1 is a diagrammatic view of conventional pH equipment employing a glass electrode made of glass of the instant invention.

The glass compositions of the present invention are used to make the bulb or membrane 10 of an otherwise conventional glass electrode 12. The glass electrode is operatively connected to a standard half-cell 14, such as saturated KCl-calomel via conventional amplification equipment 16, such as the standard Beckman Model GS pH meter or other high impedance high gain electrometric equipment. The present glass composition may be substituted for the corresponding pH sensitive glass in commercial glass electrodes, such for example as those described on pages 182–184 of the text "Electrometric pH Determinations" by Roger G. Bates (John Wiley & Sons, Inc., New York). The meter employed in association with the present electrode may be any one of the conventional high impedance meters as described in chapter 9 of the aforesaid text. The instrument may be calibrated with known solutions containing mixtures of $H^+$, $Na^+$ and $K^+$ cations and the $Na^+$ ion concentration of unknown solutions can then be measured directly by subjecting the glass and reference electrode to the unkown solutions.

In single cation solutions of $H^+$, $Na^+$, $K^+$ or $Li^+$, the glasses of the instant invention yield electrode potentials which are a linear function of the logarithm of cation activity. The electrodes are indifferent to the particular anion present, such as chloride, hydroxyl, bicarbonate, nitrate, acetate, carbonate, sulphate, thiosulphate, ferrocyanide and ferricyanide. Nor are they affected by the presence of oxidizing or reducing substances.

In mixtures of any two univalent cations, the glass electrode potential is governed by the following empirical formula:

(1) $$E = E^\circ + \frac{RT}{F} ln[(A^+)^{1/n_{AB}} + k_{AB}^{1/n_{AB}}(B^+)^{1/n_{AB}}]^{n_{AB}}$$

wherein:

$E$ = measured E. M. F.
$E^0$ = standard potential
$R$ = ideal gas equation constant
$T$ = temperature (absolute)
$F$ = Faraday constant
$(A^+)$ and $(B^+)$ = activity of the ionic species $A^+$ and $B^+$
$n_{AB}$ and $k_{AB}$ = empirical constants for a given glass composition and ionic pair $A^+$ and $B^+$.

In the case of $H^+$—$Na^+$ mixtures, $n_{HNa}$ generally equals 1 and at any fixed pH in mixtures of $$Na^+—K^+, n_{NaK}$$

generally equals 1 for the present glasses. Since for practical purposes the activity of $H^+$ can be neglected, above pH 5.6, the aforementioned generalized equation, as applied to mixtures of $Na^+$, $K^+$ and $H^+$, reduces to the following:

(2) $$E = E^\circ + \frac{RT}{F} ln[(Na^+) + k_{NaK}(K^+)]$$

The term sensitivity of $Na^+$ to $K^+$ as used herein refers to $k_{NaK}$. Thus if $k_{NaK} = 0.01$, the $Na^+$ to $K^+$ sensitivity is 100 which means that on a mole for mole basis $Na^+$ is 100 times more effective than $K^+$ in determining electrode potential.

Similarly, since $n_{HNa}$ generally equals 1 over virtually the entire pH range, it is manifest that for the ionic pair $H^+$ and $Na^+$, the aforementioned generalized equation takes the form:

(3) $$E + E^\circ + \frac{RT}{F} ln[(H^+) + k_{HNa}(Na^+)]$$

and, as stated hereabove with reference to $Na^+$ to $K^+$ sensitivity, the relative sensitivity of $H^+$ to $Na^+$ refers to $k_{HNa}$.

For $H^+$—$K^+$ and $H^+$—$Li^+$, $n$ is a constant equal to or greater than 1 but generally less than 4. For practical purposes $n$ may be treated as equal to 1 and $k_{HK}$ and $K_{HLi}$ may be equated with relative sensitivity of $H^+$ to $K^+$ and $H^+$ to $Li^+$ respectively in the same manner as relativity sensitivity of $Na^+$ to $K^+$ and $H^+$ to $Na^+$ were equated to $k_{NaK}$ and $k_{HNa}$ as aforementioned. Finally, for a given glass the $k$ values for any ion pair B, C are related to the $k$ values for the ion pairs A, C and A, B by the equation:

(4) $$k_{BC} = \frac{k_{AC}}{k_{AB}}$$

Referring now to Figures 2–5, the plot points 18 represent soda-alumina-silica glasses with varying mole percentages of $Na_2O$, $Al_2O_3$ and $SiO_2$ as determined by chemical analysis of the fused glasses from which glass electrodes were made. Using these different glass electrodes, the electrode potentials in millivolts of 0.1 N HCl, 0.1 N sodium acetate (pH 7.6), 0.1 N potassium acetate (pH 7.6) and 0.1 N lithium nitrate (pH 6.6) were measured and recorded. These values were used in the equations, forms (2) and (3) hereabove, to calculate the $k$ values of relative sensitivities.

Thus, since for practical purposes the activity of $H^+$ in the sodium acetate solutions is zero and vice versa, the activity of $Na^+$ in the HCl solutions is zero, substitution of the measured electrode potentials and other known values in Equation 3 yields two simultaneous equations from which the relativity sensitivity of $H^+$ to $Na^+$ or $k_{HNa}$ is calculated for each of the plotted glass compositions 18. The same procedure is employed to calculate $k_{HK}$, $k_{NaK}$ and $k_{HLi}$ or the relative sensitivities of $H^+$ to $K^+$, $Na^+$ to $K^+$ and $H^+$ to $Li^+$ respectively for the plotted glass compositions 18.

These $k$ values were drawn as interpolated contour lines of isosensitivity, 20 on each of the ternary diagrams, Figures 2–5, the designations 22 adjacent each line being the reciprocal of the indicated $k$ values for each ionic pair as captioned in the figures.

Figure 2:
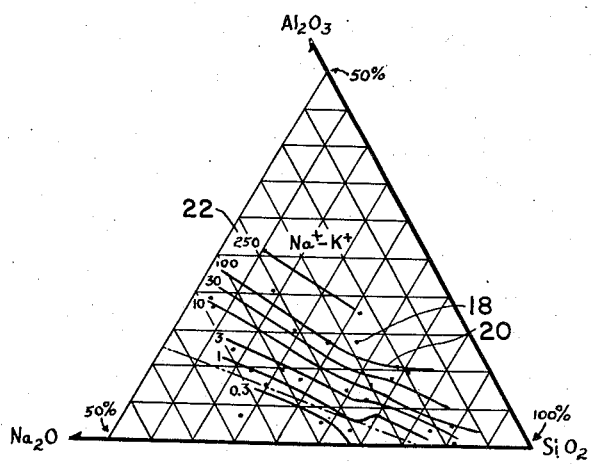
Figure 2 is a ternary diagram of a $Al_2O_3$—$Na_2O$—$SiO_2$ composition field showing contours illustrating $Na^+$ to $K^+$ sensitivity.
Figure 3:
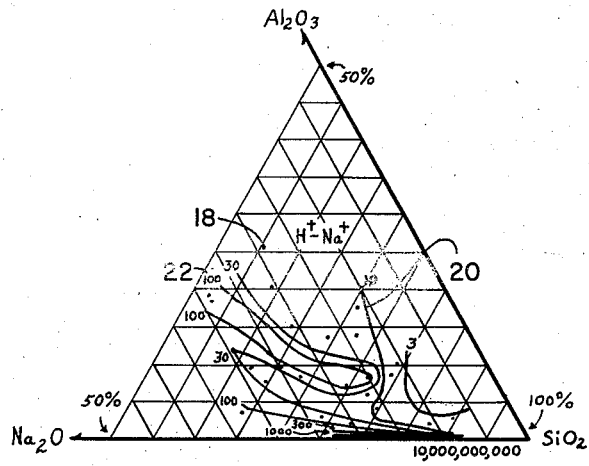
Figure 3 is a ternary diagram similar to Figure 2 illustrating $H^+$ to $Na^+$ sensitivity.
Figure 4:
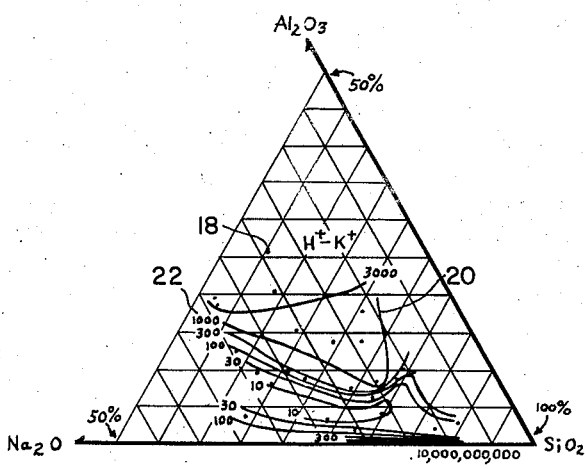
Figure 4 is a ternary diagram similar to Figure 2 illustrating $H^+$ to $K^+$ sensitivity.
Figure 5:
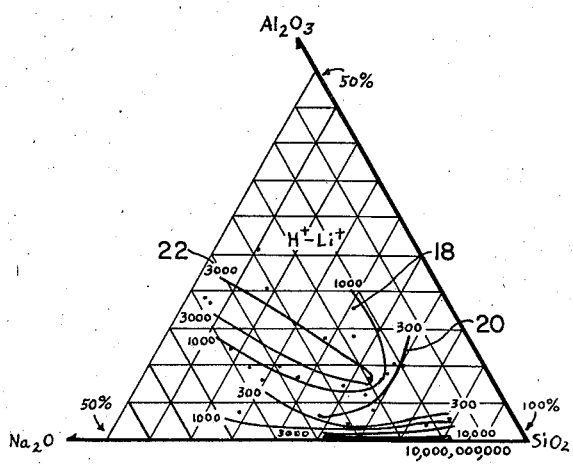
Figure 5 is a ternary diagram similar to Figure 2 illustrating $H^+$ to $Li^+$ sensitivity.

Since the instant invention is primarily concerned with relative sensitivity of $Na^+$ to $K^+$, consideration of Figure 2 shows that silicate glasses having at least approximately 1:1 mole percent ratio of $Al_2O_3$ to $Na_2O$ are sufficiently sensitive to $Na^+$ relative to $K^+$ to render such compositions of practical utility for the construction of a sodium ion electrode.

To determine $Na^+$ in the presence of $K^+$ and $H^+$ a glass electrode is required which is maximally sensitive to $Na^+$ and minimally sensitive to $H^+$. Such compositions can be ascertained by superimposing Figure 2 ($Na^+$—$K^+$) upon Figure 3 ($H^+$—$Na^+$). In so doing it will be observed that there is an area to the right of the 10 contour line of Figure 3 and adjacent the 250 contour line of Figure 2 which broadly defines glass compositions having a $Na^+$ to $K^+$ sensitivity of at least 250 and a $H^+$ to $Na^+$ sensitivity no greater than 10:1. Such compositions are of practical utility in the construction of a sodium ion electrode which is of practical utility in measuring $Na^+$ in the presence of $K^+$ and $H^+$.

The particular glass composition which was found to be optimally suitable for this purpose is $NAS_{11-18}$, or a soda-alumina-silica glass whose chemical analysis in the fused state shows that it is composed of 11 mole percent $Na_2O$, 18 mole percent $Al_2O_3$ and 71 mole percent $SiO_2$.

An examination of Figure 2 ($Na^+$—$K^+$) shows that certain soda-alumina-silica compositions are more sensitive to $K^+$ than to $Na^+$. Such a composition region lies below the 1 contour line. This region may be described verbally as containing all glasses in which the mole percent of $Na_2O$ is equal to or greater than twice the sum of the mole percent of $Al_2O_3$ and 6.25 mole percent. The glass having the highest $K^+$:$Na^+$ sensitivity contains $Na_2O$ 23 mole percent, $Al_2O_3$ 3 mole percent and $SiO_2$ 74 mole percent. This $NAS_{23-3}$ glass is 5.5 times as sensitive to $K^+$ as to $Na^+$, or conversely 0.18 times as sensitive to $Na^+$ as to $K^+$. By using such an electrode in conjunction with a highly selective $Na^+$ electrode, it is possible uniquely to measure both $Na^+$ and $K^+$ activities of an unknown mixture of said ions.

An illustrative example of the method of measuring $Na^+$ and $K^+$ activities in unknown mixtures of said ions is as follows. At an appropriate pH, measure the potential of 0.1 N $Na^+$, 0.1 N $K^+$ and the unknown solution using both the highly $Na^+$ selective electrode, such as $NAS_{11-18}$ and the $K^+$ selective electrode, such as $NAS_{23-3}$. Employing Equation 2 hereinabove, one can solve for $E_0$ for both the $NAS_{11-18}$ and $NAS_{23-3}$ electrodes as well as the constant $k_{NaK}$ for said electrodes. These values are then inserted in Equation 2 with the measured potentials of the unknown solution for both glass electrodes, from which results a pair of simultaneous equations which can be solved for both $Na^+$ and $K^+$ activity.

It has been found that small amounts up to several mole percent of $CaO$ and $Fe_2O_3$, which may be added to improve other physical properties of the glass, do not significantly alter the electrode function. Also, the preferred $NAS_{11-18}$ glass is relatively insensitive to $Ca^{++}$, $Mg^{++}$, $NH_4^+$ and $Li^+$ except if the latter are present in unusual concentrations.

Besides the above "ion errors," the precision and accuracy of measuring $Na^+$ activity are affected by such factors as electrode drift, amplifier sensitivity and noise, reference electrode noise, reproducibility of voltages when changing solutions, purity of reagents, accuracy of preparing standards, stray electrical fields and temperature fluctuations. We have been able to detect differences as small as 1 percent between standard NaCl solutions using the standard Beckman Model GS pH meter. It is reasonable to expect that with refinement of technique, the present glass electrode will enable one to measure $Na^+$ activity to 0.1 percent without taking a prohibitively large number of readings using commercially available high gain electrometers.

While the present glass electrode has application in a variety of fields, it is of special importance in the measurement of $Na^+$ activity in biological fluids. These fluids may produce two possible sources of error. One is protein poisoning of the glass. No qualitative indication of poisoning of the electrodes by constituents of serum, cerebrospinal fluid, or brain homogenate has been found. The electrodes also show the expected potentials when known concentration changes of $Na^+$, $H^+$, $K^+$ or $Ca^{++}$ are produced in the above fluids and the unknown ionic strength contribution due to protein are disregarded. Another possible source of error is the possible effect on the electrode of other sources of electrode potential, such as the electrical potential fields of membrane origin or diffusion potentials resulting from extracellular ionic concentration gradients. Methods have been developed which are capable of distinguishing $Na^+$ activity from the aforementioned other effects.

We claim:

1. A process of selectively measuring sodium ion activity in an ionic mixture including the potassium and hydrogen ions comprising providing an electrode made of a soda-alumina-silica glass in which the ratio of the mole percent of $Al_2O_3$ to $Na_2O$ is at least substantially 1:1, subjecting the mixture to said glass electrode and to a standard reference half-cell and operatively connecting the glass electrode and reference half-cell to a high impedance electrometric amplifier.

2. A process of selectively measuring sodium ion activity in an ionic mixture including the potassium and hydrogen ions comprising providing an electrode made of a soda-alumina-silica glass comprising 11 mole percent $Na_2O$, 18 mole percent $Al_2O_3$ and 71 mole percent $SiO_2$, subjecting the mixture to said glass electrode and to a standard reference half-cell and operatively connecting the glass electrode and reference half-cell to a high impedance electrometric amplifier.

3. A process of measuring both sodium and potassium ion activities in ionic mixtures of said ions comprising first measuring the potential of the unknown mixture using a glass electrode made of a soda-alumina-silica glass in which the mole percent ratio of $Al_2O_3$ to $Na_2O$ is at least substantially 1:1, then measuring the potential of the unknown mixture using a glass electrode made of a soda-alumina-silica glass in which the mole percent of $Na_2O$ is at least equal to twice the sum of $Al_2O_3$ and 6.25, then calculating the activities of Na+ and K+ from simultaneous equations of the form:

$$E=E^{\circ}+\frac{RT}{F}ln[(Na^+)+k_{NaK}(K^+)]$$

wherein:

$E$ = measured potential for electrode
$E^0$ = standard potential for each electrode
$R$ = ideal gas equation constant
$T$ = absolute temperature
$F$ = Faraday constant
$k_{NaK}$ = empirical constant for the glass composition of each electrode
$(Na^+)$ and $(K^+)$ = activities of Na+ and K+.

4. A process of measuring both sodium and potassium ion activities in ionic mixtures of said ions comprising first measuring the potential of the unknown mixture using a glass electrode made of a soda-alumina-silica glass comprising 11 mole percent Na$_2$O, 18 mole percent Al$_2$O$_3$ and 71 mole percent SiO$_2$, then measuring the potential of the unknown mixture using a glass electrode made of a soda-alumina-silica glass comprising 23 mole percent Na$_2$O, 3 mole percent Al$_2$O$_3$ and 74 mole percent SiO$_2$, then calculating the activities of Na+ and K+ from simultaneous equations of the form:

$$E=E^{\circ}+\frac{RT}{F}ln[(Na^+)+k_{NaK}(K^+)]$$

wherein:

$E$ = measured potential for electrode
$E^0$ = standard potential for each electrode
$R$ = ideal gas equation constant
$T$ = absolute temperature
$F$ = Faraday constant
$k_{NaK}$ = empirical constant for the glass composition of each electrode
$(Na^+)$ and $(K^+)$ = activities of Na+ and K+.

5. A glass electrode for selectively measuring sodium ion activity in ionic mixtures including the potassium and hydrogen ions, said electrode having a membrane of soda-alumina-silica composition in which the ratio of the mole percent of Al$_2$O$_3$ to Na$_2$O is at least substantially 1:1.

6. A glass electrode for selectively measuring sodium ion activity in ionic mixtures including the potassium and hydrogen ions, said electrode having a membrane of soda-alumina-silica composition comprising 11 mole percent Na$_2$O, 18 mole percent Al$_2$O$_3$ and 71 mole percent SiO$_2$.

References Cited in the file of this patent

UNITED STATES PATENTS

| | | |
|---|---|---|
| 1,933,739 | Kraner | Nov. 7, 1933 |
| 2,108,294 | Doyle et al. | Feb. 15, 1938 |
| 2,260,749 | Kelsey | Oct. 28, 1941 |
| 2,383,709 | Cary | Aug. 28, 1945 |
| 2,527,693 | Armistead | Oct. 31, 1950 |
| 2,571,242 | Hood | Oct. 16, 1951 |
| 2,779,136 | Hood et al. | Jan. 29, 1957 |

OTHER REFERENCES

Hughes: Chemical Eng. Mining Review, vol. 20, 1927.